(12) United States Patent
Lu (10) Patent No.: US 10,261,185 B2
(45) Date of Patent: Apr. 16, 2019

(54) SYSTEM AND METHOD FOR REMOTELY MEASURING DISTANCES BETWEEN TWO POINTS

(71) Applicant: Bin Lu, Saratoga, CA (US)

(72) Inventor: Bin Lu, Saratoga, CA (US)

( * ) Notice: Subject to any disclaimer, the term of this patent is extended or adjusted under 35 U.S.C. 154(b) by 840 days.

(21) Appl. No.: 14/845,268

(22) Filed: Sep. 4, 2015

(65) Prior Publication Data

US 2017/0067987 A1 Mar. 9, 2017

(51) Int. Cl.
*G01C 3/08* (2006.01)
*G01S 17/08* (2006.01)
*G01S 17/02* (2006.01)
*G01S 17/46* (2006.01)
*G01S 7/48* (2006.01)

(52) U.S. Cl.
CPC ............ *G01S 17/08* (2013.01); *G01S 7/4808* (2013.01); *G01S 17/023* (2013.01); *G01S 17/46* (2013.01)

(58) Field of Classification Search
CPC ...... G01S 17/08; G01S 7/4808; G01S 17/023; G01S 17/46
See application file for complete search history.

(56) References Cited

U.S. PATENT DOCUMENTS

| | | | |
|---|---|---|---|
| 5,291,262 | A | 3/1994 | Dunne |
| 5,949,531 | A | 9/1999 | Ehbets et al. |
| 6,624,881 | B2 | 9/2003 | Waibel et al. |
| 6,917,415 | B2 | 7/2005 | Gogolla et al. |
| 7,304,727 | B2 | 12/2007 | Chien et al. |
| 7,535,555 | B2 | 5/2009 | Nishizawa et al. |
| 7,940,378 | B2 | 5/2011 | Gogolla et al. |
| 2013/0237811 | A1* | 9/2013 | Mihailescu ............ A61B 5/064 600/424 |

* cited by examiner

*Primary Examiner* — Samantha K Abraham
(74) *Attorney, Agent, or Firm* — Robert Brownstein (57) ABSTRACT

The system and method invention herein disclosed and claimed is measuring device that can remotely measure the distance between two points on a surface.

13 Claims, 8 Drawing Sheets

SYSTEM AND METHOD FOR REMOTELY MEASURING DISTANCES BETWEEN TWO POINTS

TECHNICAL FIELD

This invention is associated with distance measuring devices.

BACKGROUND OF THE INVENTION

Measuring devices, such as rulers and tape measures, have been used for a long time to measure the distance between two points. Typically one end of the measuring device is held or anchored at one point, and the position of a second point along the measuring device is noted.

When measuring the distance between two points that exceed arm's breadth, two people are typically involved in making the measurement with a tape measure. One person holds the end of the device at point one, and the second person extends the tape measure until it abuts the second point.

Devices have been invented and developed that allow one person to measure the distance between the device and, say, a point where two walls abut one another usually at right angles. In such cases, the device is placed at one end of a wall, and a laser beam is projected to the adjoining wall such that it reflects back along the same path and the distance is measured by noting the round-trip time and computing the distance based on light speed (e.g. d=c/2 t).

There are instances where one wants to measure the distance between two points that are high up on a wall, say, and would not be easily measured using a tape measure without having to use two people and two ladders, for example. In that case, using a laser-based device is a problem, too, because one would need the use of ladders and one would have to affix a reflecting target at the second point.

It would be very useful if one had a handheld device, like the laser "tape" measure, that could be pointed at one point, and then activated; and subsequently pointed at the second point, and activated; and it would quickly determine the distance between those two points.

BRIEF SUMMARY OF THE INVENTION

The invention herein disclosed and claimed is a system and method for remotely measuring the distance between two points.

The device uses a laser transceiving component to measure the distance between it and a first point. It then uses the same laser transceiving component to measure the distance between it and a second point. As the device is rotated and moved while detecting the distances between it and points one and two, its position in three dimensions (x, y and z) is sampled by measuring changes in three dimensional (3D) spatial position and angular orientation. In addition, the beam's angle with respect to a horizontal reference plane (e.g. a floor) is also measured for points one and two.

With the data noted during the measuring instances plus the changing 3D data sampled as the device is moved and rotated between the two measuring instances, one can establish the distances of two sides of a triangle, that is the distance between the device and a first point and the distance between the device and a second point. The point where the device resides in 3D may change during those measurement instances. However, the two positions can be resolved to a single equivalent point, and the three points that result are then contained within a plane. One then has two sides of a triangle and the included angle and can calculate the length of the third side using sine and cosine laws. Furthermore, by measuring the angle of the beam with respect to a horizontal reference plane (e.g. a floor) when the first point distance is measured and when a second point distance is measured, one can determine each point's vertical distance from the horizontal reference plane and any vertical displacement between a first point and a second point. And, if one measures the distance between the device and two points located essentially along a vertical line, one can measure the angular orientation of the measuring device with respect to the two points and determine if the line is truly vertical or if one point is displaced horizontally with respect to the other point.

BRIEF DESCRIPTIONS OF THE DRAWINGS

FIG. 3B depicts another embodiment wherein the subsystems comprising the system in FIG. 3A do not include a processing subsystem. Instead, data from the system is conveyed wirelessly to another entity where processing can be done, such as a laptop, smartphone, tablet, and the like.

As in FIG. 5.

DETAILED DESCRIPTION OF THE INVENTION

Measuring the linear distance between two points can be done by noting the position of said points along a measuring reference of known length divided into precise length fractions. An example would be a ruler or tape measure.

One can also measure the linear distance between two points by using a measuring device containing a laser transceiver and circuitry operative to measure round-trip flight of light between the device located at a first point and a reflecting surface located at the second point.

Figure 1:
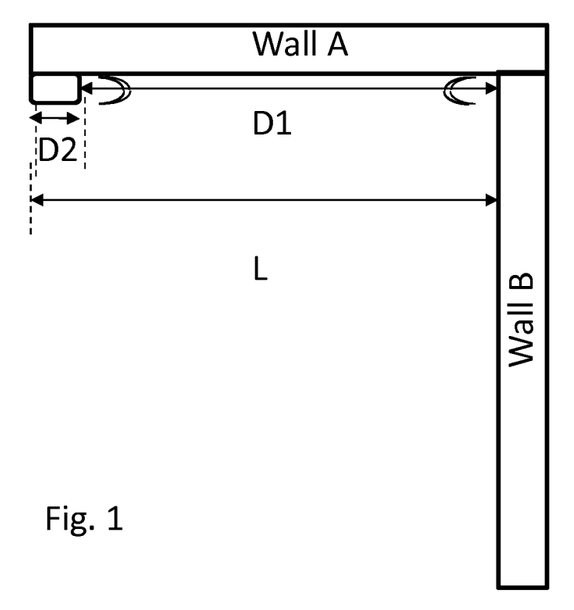
FIG. 1 depicts use of a laser "tape" measure to measure a distance, L, along a wall (Wall A) to an adjoining wall (Wall B). The perspective is looking down from a top view.

As shown in FIG. 1, from a top view perspective, a laser measuring device at the left-hand edge of Wall A sends a laser beam parallel to Wall A that reflects off of adjoining Wall B and whose reflected beam is detected by said device. The round-trip flight is measured as D1 and the length of the measuring device is a fixed D2. Thus, the length, L, is the sum of D1 and D2.

Figure 2:
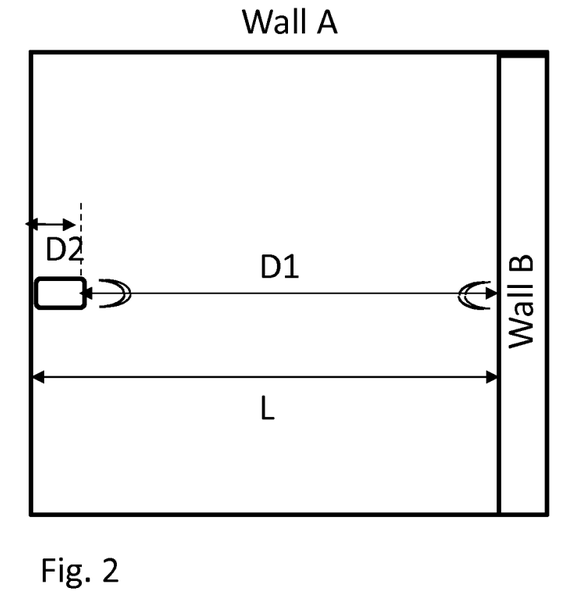
FIG. 2 depicts use of a laser "tape" measure to measure a distance, L, along a wall (Wall A) to an adjoining wall (Wall B). The perspective is looking from a front view.

FIG. 2 illustrates the same measuring process from a front perspective. Note that for measurement accuracy, the measuring device should be transmitting and receiving a beam that is parallel to Wall A's surface and parallel to Wall A's bottom edge.

Note that a conventional laser measuring device can only measure distances between itself and a reflecting point. It cannot measure the distance between a first point and a second point that are remote from the device, such as two points on a wall. It can however measure the distance between a first point and the measuring device, and between a second point and the measuring device. However, in order to use plane geometric relationships in order to calculate the distance between a first point and a second point, the measuring devices position in space and the angle between the beam when measuring the first point, and the beam when measuring the second point must also be measured. In addition, the angle between the beam and a horizontal reference plane, such as a floor, may also be measured when taking each distance reading (e.g. between the device and a first point and between the device and a second point). With the distances between the device and a first point, and between the device and a second point, plus measuring the device's position in three-dimensional (3D) space when making each measurement, plus the angular change in laser beam when making each measurement, plus the angles between said beam and a horizontal reference plane when making each measurement will provide all the data required to determine the distance between a first point and a second point, and to measure any vertical or horizontal displacement of a second point relative to a first point.

Figure 3A:
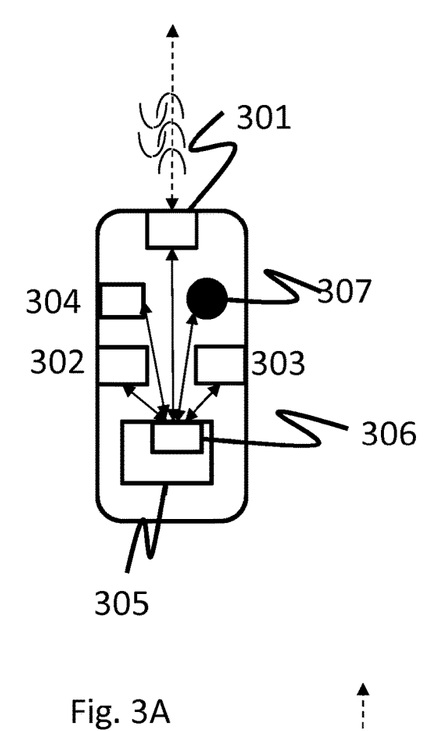
FIG. 3A depicts one embodiment of the system disclosed and claimed. It is a laser measurement device comprising a laser transceiving subsystem plus subsystems for measuring 3D position, angular orientation, and laser beam angle with respect to a horizontal reference plane; and a processing subsystem which calculates distance based on laser measurements and geometric relationships.

FIG. 3A depicts a system for measuring the distance between a first point and a second point remotely located from said device. The handheld system contains a laser transceiving subsystem 301 that can send a beam of laser light, in a straight line, from the laser source to a point of interest. The light reflected back to said system can be measured in terms of round trip time and a distance, d, is calculated by d=c/2 t, where d is distance, c is speed of light, and t is round-trip time. The system further comprises a subsystem 302, such as an accelerometer or GPS receiver that can detect changes in spatial position. The system further comprises a subsystem 303 that can detect changes in angular orientation of the device's laser beam, such as a gyroscopic detector. The system further comprises a subsystem 304 that can detect the laser beam's angle with respect to a horizontal reference surface, such as a floor. An electronic miniature "level" could detect the angular displacement between the beam and the horizontal, for example. The system further comprises a subsystem 306 operative to convey (e.g. receive and send) signals between itself and the other subsystems. The system further comprises a subsystem 305 operative to control, capture, store and execute programmed algorithms. The system further comprises an activating control 307 that initiates a series of actions comprising sending and receiving a laser beam signal, measuring 3D position and subsequent changes in position, measuring angular rotation and resulting angular change, measuring laser beam angle relative to a horizontal reference plane, gathering resulting data, storing said data, executing programmed algorithms, displaying selected results. The system further comprises a display subsystem (not shown).

Figure 3B:
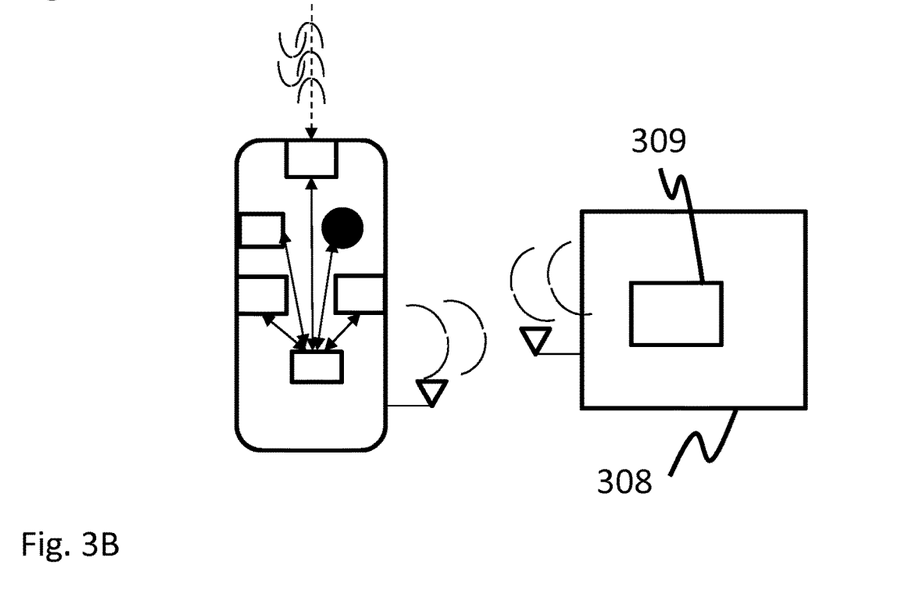

FIG. 3B shows a system, such as that shown in 3A, where the processing subsystem and display subsystem may be embodied in another system, such as a laptop, smartphone, or tablet. The data captured and stored in the measuring system is conveyed, wirelessly, to the adjunct system where an application processes that data to find and display predetermined parameters.

Figure 4:
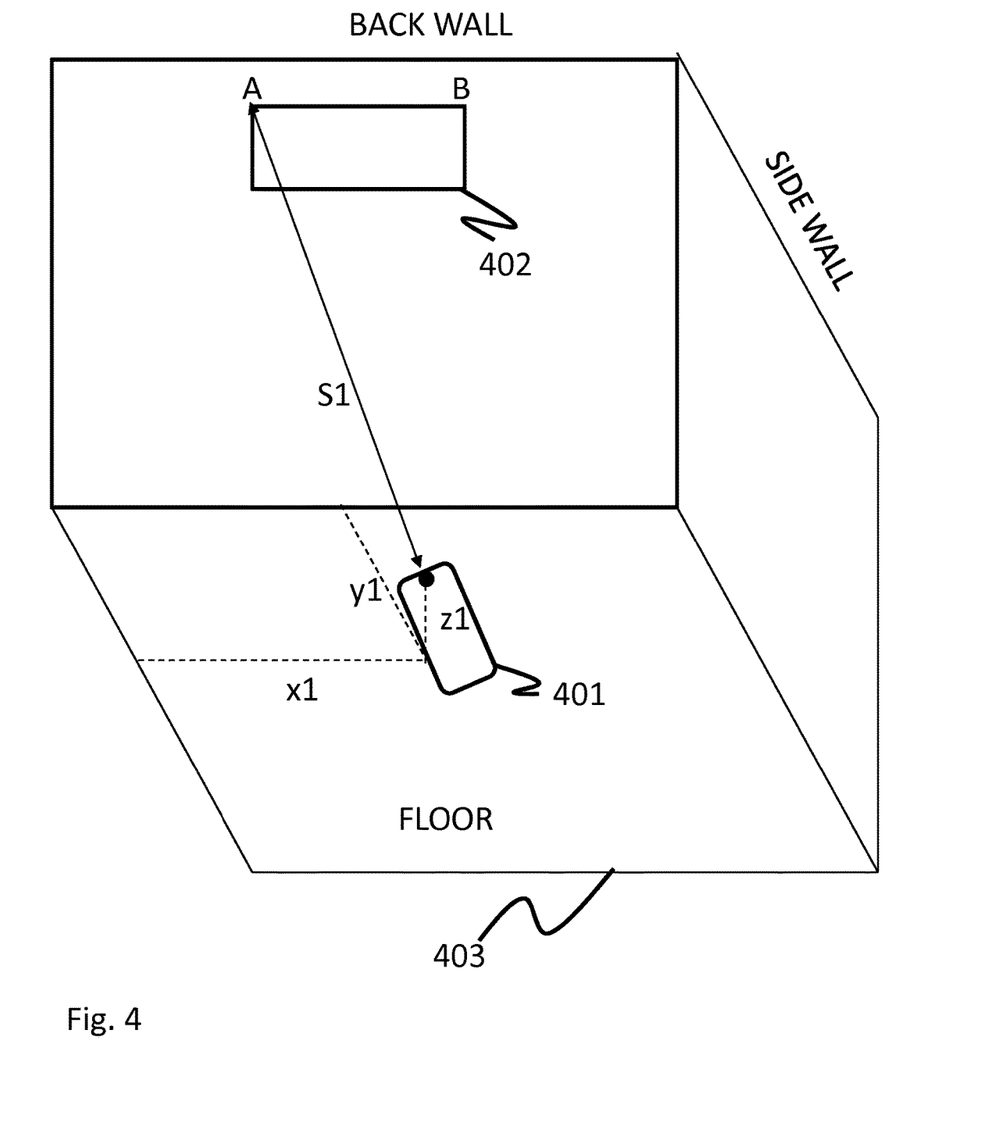
FIG. 4 depicts using a measuring device, such as that of FIG. 3A, for measuring a first point, A. The distance between the device's laser beam source/detector and a first point is shown as S1. The device's position in three dimensions is shown as X1, Y1 and Z1.

FIG. 4 illustrates a measuring of the distance between a system as in FIG. 3A or 3B and a first point (A) on a wall surface. The distance measured between the system's laser source and a first point is S1. This measurement makes use of the laser transceiving subsystem. The 3D position subsystem detects the system's position and X1, Y1 and Z1 data are determined and stored. In addition the angle of the laser beam with a horizontal reference plane is measured ($\beta 1$) and stored.

Figure 5:
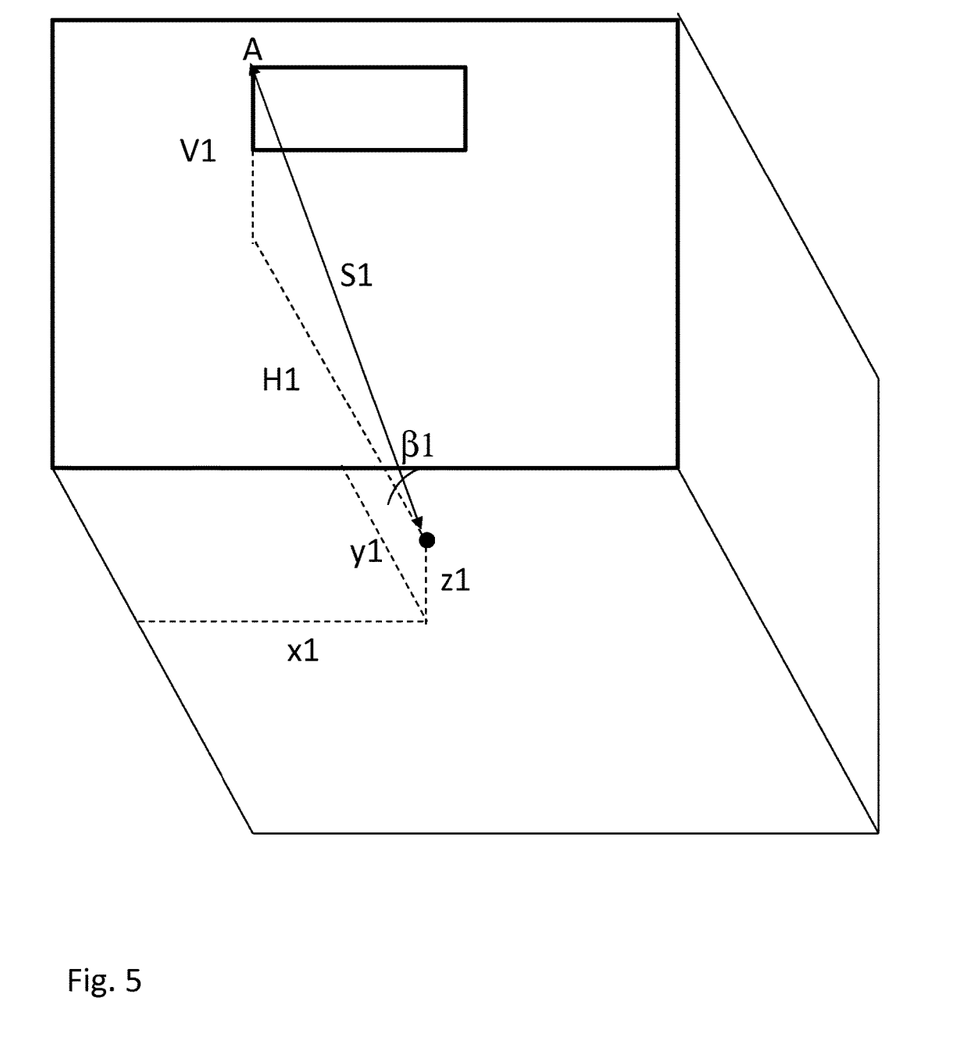
FIG. 5 shows that in addition to measuring distance S1, the device also measures the angle between the laser beam and ground reference. That angle is shown as $\beta 1$. Knowing this angle and side, S1, one can easily find the right triangle formed by sides S1, V1 (the vertical component projection), and H1 (the horizontal component projection). The points of the right triangle are A, the device's laser source, and the intersection of V1 and H1.

FIG. 5 shows how the data that results from the actions of FIG. 4 provide the distance between the system's laser source and a first point A, the angle between the laser beam and horizontal reference plane $\beta 1$, the position in space of the device when the measurement is made (X1, Y1 and Z1). Knowing Z1 and $\beta 1$ and S1 one can determine the vertical component projection V1. Knowing S1 and V1, one can determine H1, the horizontal component projection. As a result one can conceptually construct the triangle formed by points A, the device's laser source, and the intersection of V1 and H1.

Figure 6:
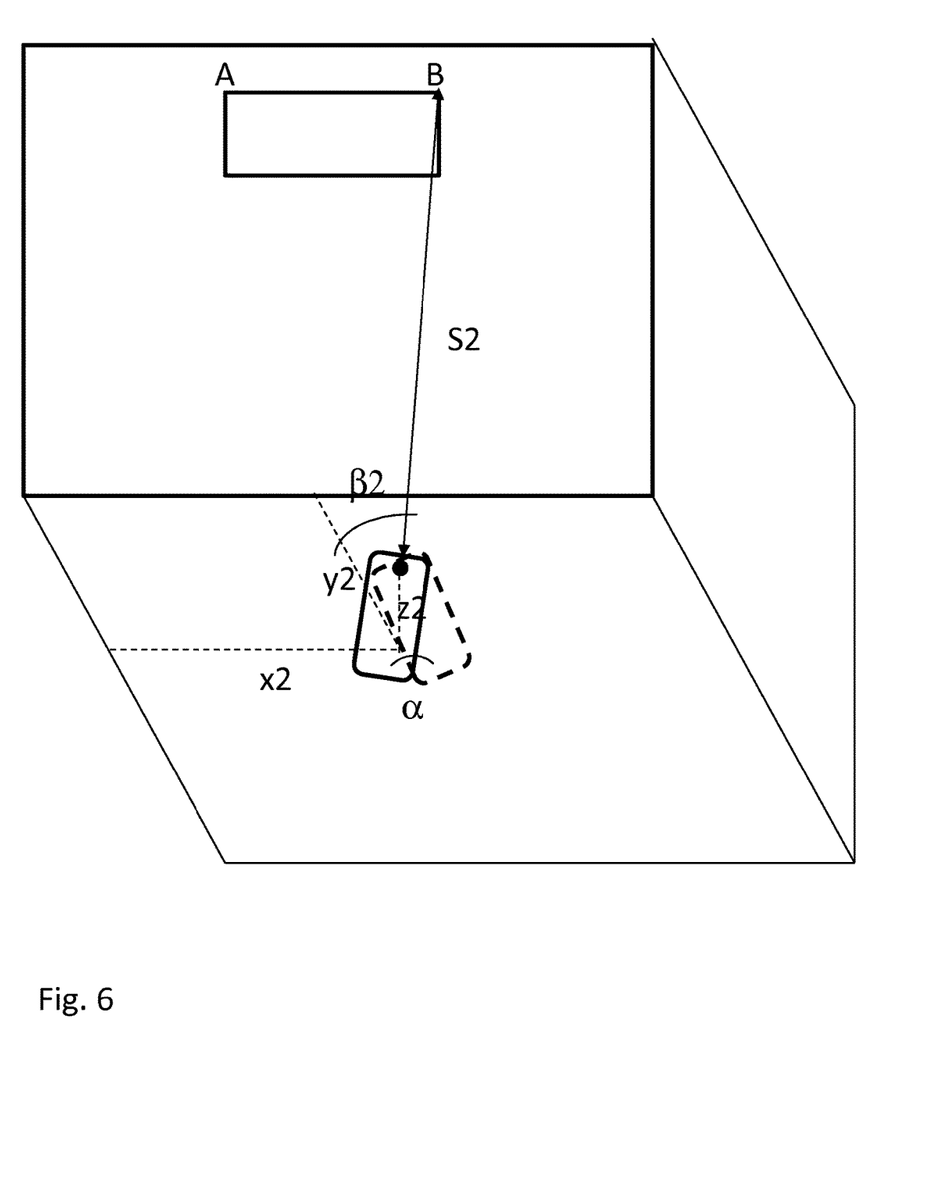
FIG. 6 shows a system, such as that of FIG. 3A, where the distance between a second point (B) and the device can be measured. In addition, the 3D position is now X2, Y2 and Z2, the angle between beam and horizontal reference plane is $\beta 2$, and the beam will have effectively rotated through an angle $\alpha$ as it is swept from point A to point B. The difference in angular orientation between a first point and second point would be $\alpha$.

FIG. 6 depicts a measurement of a second point involving pointing the system's laser beam at a second point B and measuring the distance between said second point and the system's laser source. This is shown as S2. Again, the 3D position subsystem detects the spatial position of the system and its coordinates X2, Y2 and Z2. In addition, the angular position subsystem detects that the system has rotated through an angle $\alpha$. In addition a subsystem has also determined the angle of the laser beam with the horizontal reference plane. It is angle $\beta 2$.

Figure 7:
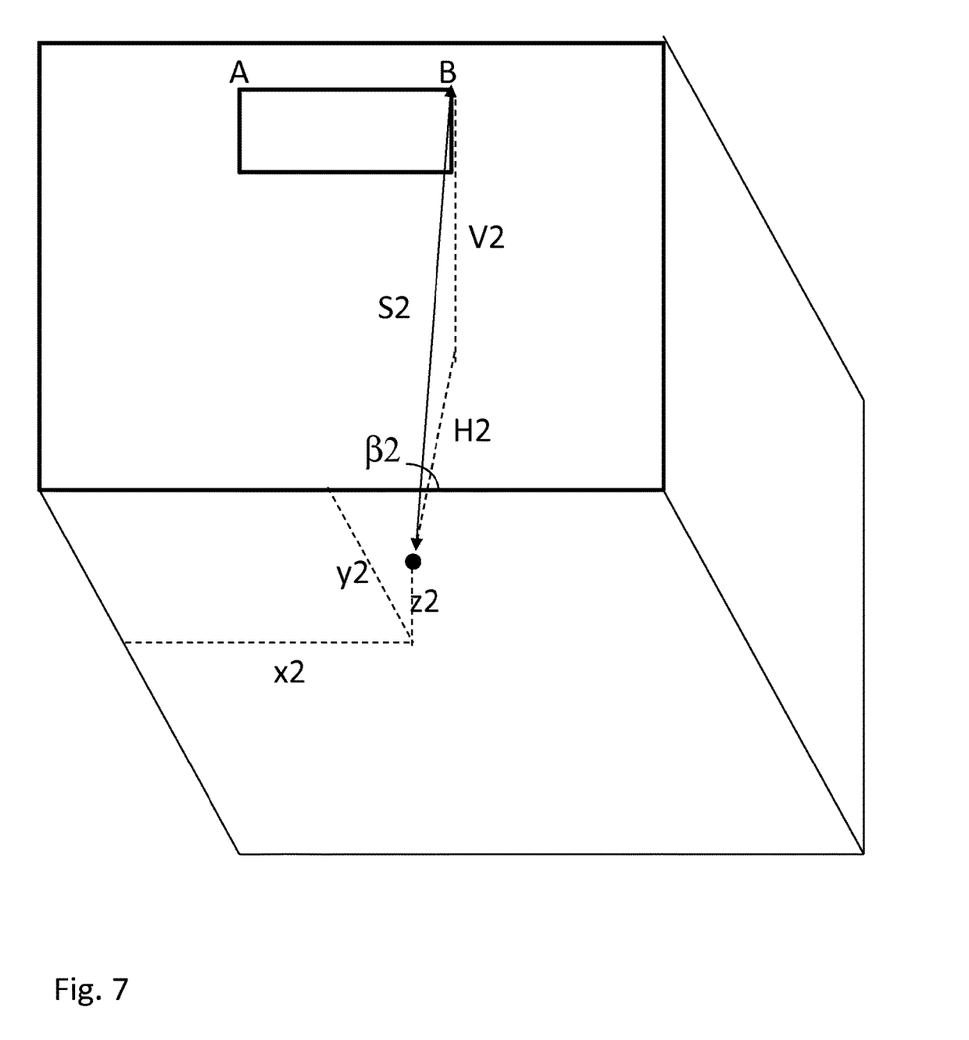
FIG. 7 shows that in addition to measuring the distance S2, the device also measures the angle between the laser beam and horizontal reference plane. That angle is shown as $\beta 2$. Knowing this angle and side, S2, one can easily find the right triangle formed by sides S2, V2 (the vertical component projection), and H2 (the horizontal component projection). The points of the right triangle are B, the device's laser source, and the intersection of V2 and H2.
Figure 8:
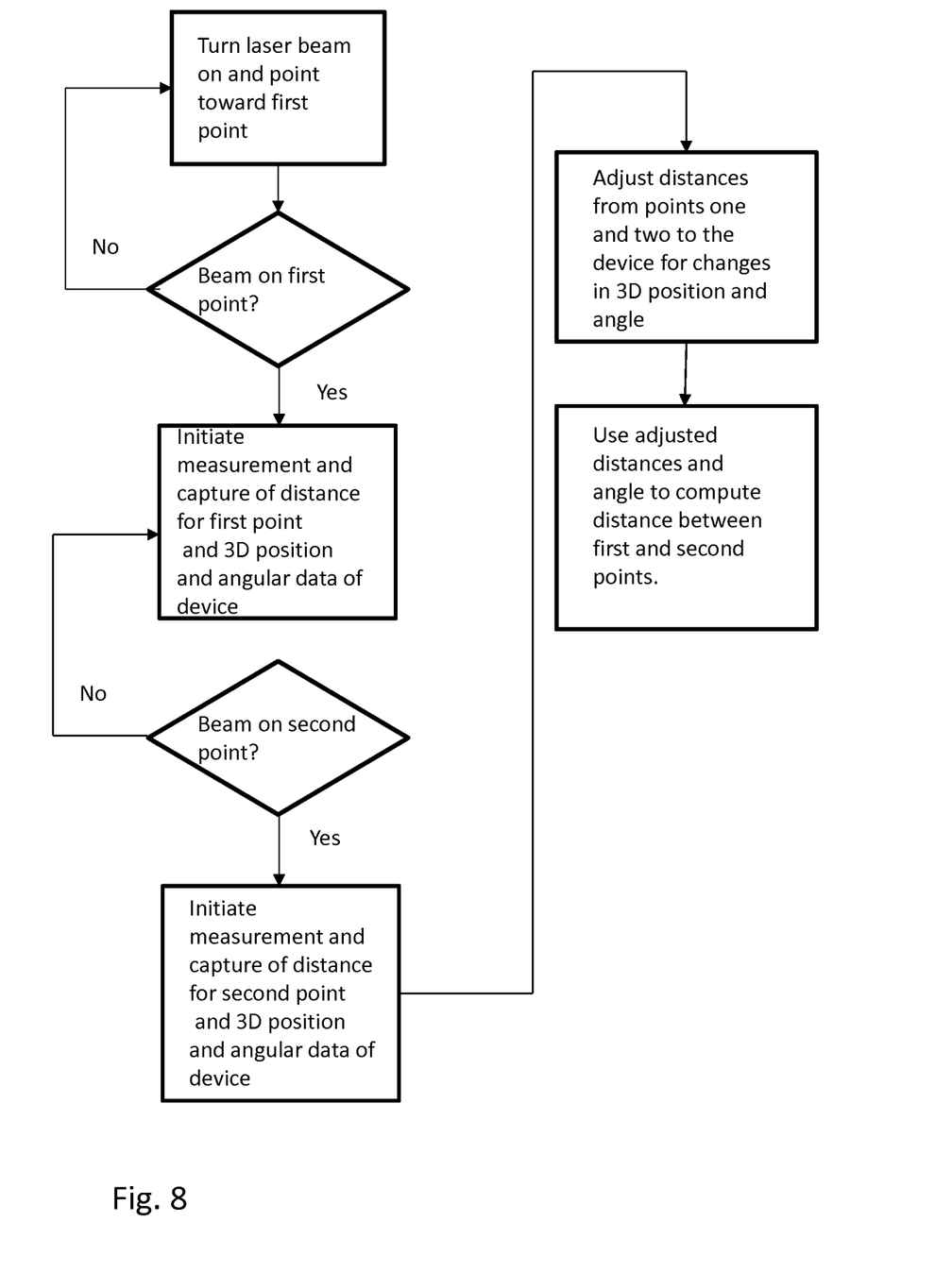
FIG. 8 shows an exemplary flow diagram for one embodiment of the method disclosed and claimed where one can find the distance between a first point and second point using a system such as that of FIG. 3A.
Figure 9:
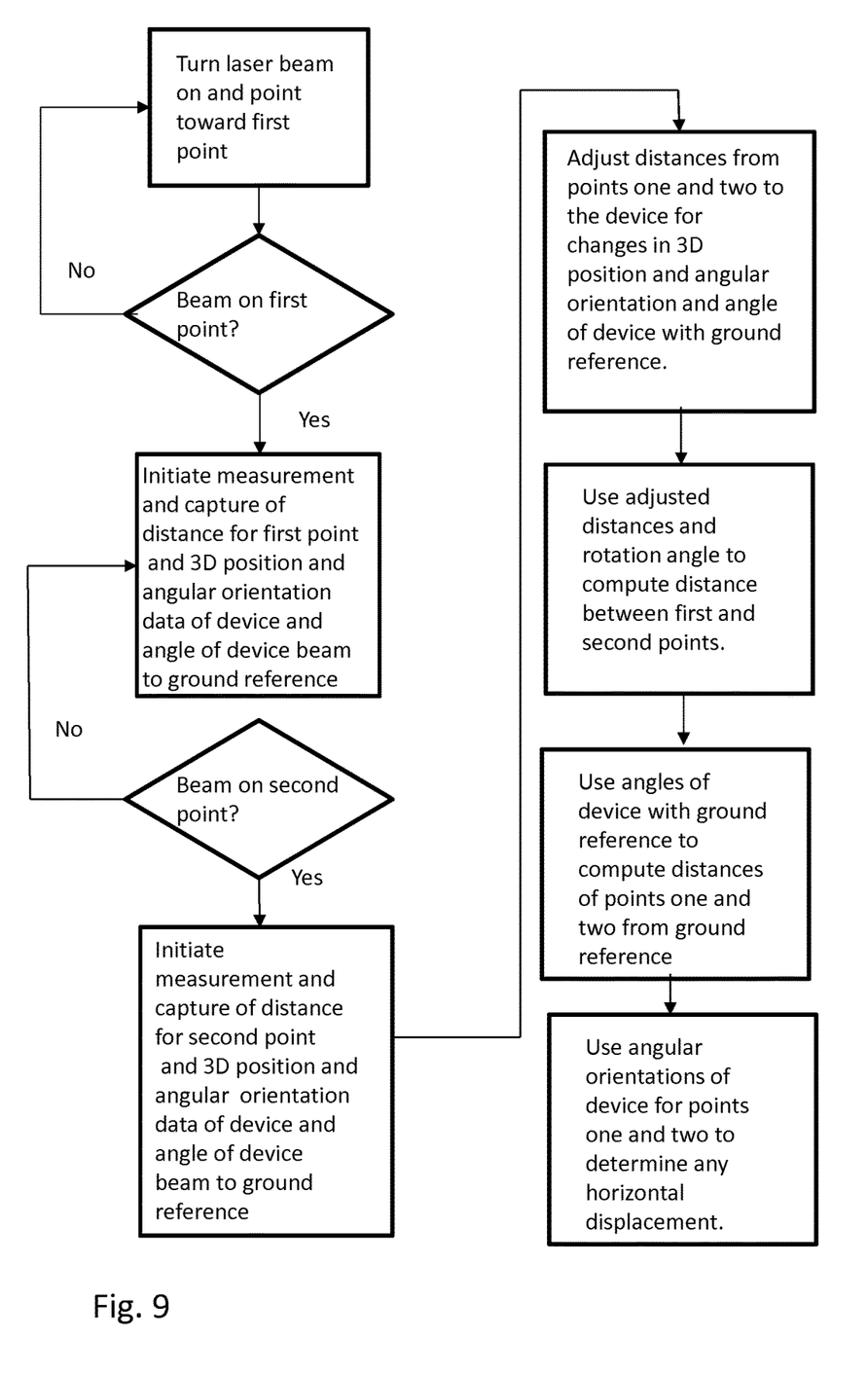
FIG. 9 shows an exemplary flow diagram for another embodiment of the method disclosed and claimed where one can find the vertical distance of a first point and a second point relative to a ground surface, and the horizontal displacement of a first point relative to a second point when points are located on an essentially vertical line.

FIG. 7 illustrates that the data for S2, $\beta 2$ and Z2 supports conceptual construction of a triangle with sides S2, V2 and H2. In addition, the determination of rotation angle $\alpha$ supports conceptual construction of a triangle with sides S1

(not shown) and S2 in addition to the included angle α. If X1, Y1 and Z1 are equal to X2, Y2 and Z2, then the point of the system's laser source is the same for both measurements S1 and S2, and simple application of law of sines and cosines will yield the distance between points A and B. However, if X1, Y1, Z1 are not equal to X2, Y2 and Z2, it is well known in plane geometry how to compensate for the differences and have the two positions coincide with commensurate small changes in S1, S2 and α. Once the compensation is made, again a simple application of law of sines and cosines will yield the distance between A and B, or a first point and second point located remotely from said system.

One can also determine whether two points on a wall, say, form a line parallel with a horizontal reference plane. By using the findings for H1 and H2, and compensating for any differences in Z1 and Z2, one can determine the vertical displacement of a first point from a second point relative to the horizontal reference plane. Furthermore, by measuring two points along a line that is essentially vertical, one can determine any deviation from the vertical by noting any change in angular orientation of the beam when measuring a first point and when measuring a second point.

The method for applying the system to measure the distance between a first point and a second point relies on an interaction between a person wielding the measuring system and the system's coordinated subsystem interactions.

Standing on a floor, some distance from a first point on a wall or other essentially vertical surface, a user activates the laser beam and points it on said first point. With the beam essentially shining on said first point, the user activates the measuring sequences which result in measuring the distance between the system laser source and said first point, the system's current spatial position, the system's current angular orientation with respect to a fixed reference (e.g. the north direction of a compass) and the angle of the beam with the horizontal reference plane. All resulting measurements are then stored.

Now, rotating the system and activating the beam, the user points it at a second point. With the beam essentially shining on said second point, the user activates the measuring sequences which result in measuring the distance between the system laser source and said second point, the system's current spatial position, the system's current angular orientation, the angle of the beam with the horizontal reference plane. One can determine the angle of rotation between the position of beam at the time of first point measurement and the position of the beam at the time of second point measurement. The angle of rotation is simply the difference in angular orientation at the times of first and second measurement. All resulting measurements are then stored.

With the results from the first measurement event and those from the second measurement event, the system executes one or a plurality of algorithmic programs which make use of all the stored measurement results and yield the distance between said first point and said second point. The distance may then be displayed on the system for the user's perusal.

The stored measurement event results can also be used to find the vertical displacement of the first and second points from the horizontal reference plane, and relative to one another. The stored measurement event results can also be used to find the horizontal displacement of the first and second points relative to one another. If horizontal displacement in three dimensions is zero, the points lie on a vertical line. Those results may also be displayed on the system for the user's perusal.

Various integral measurements, such as the α angle or β angles, and the distances between the system's laser source and said first point, and the distances between the system's laser source and said second point may also be displayed.

Note that the use of laser measurement to measure the distance between a laser measuring device and a point of interest is prior art. A conventional laser measuring device could measure the distance between itself and a first point, and between itself and a second point. But without the spatial positioning and angular orientation data at hand, one cannot accurately determine the distance between a first and second point. It is the combination of subsystems in the measuring system and their coordinated application that results in a novel, handheld, measuring device capable of measuring the distance between a first point and a second point remotely located from the measuring device. The mathematical methods for finding the length of a third side of a triangle with knowing the lengths of two sides and an included angle is basic plane geometry. However, the subsystems for determining the position of the measuring point (e.g. the spatial position of the system) and angular orientations, and then computing the distance between a first and second point using that data is unique in a handheld measuring device. Furthermore, the measuring system need not be securely anchored in position in order to determine the distance between two points remote to the device. The subsystems of which it is comprised serve to correct for changes in position to yield reasonably accurate results.

What is claimed is:

1. A measuring system comprising:
    a distance-measurement subsystem operative to send a beam of visible laser light to a point on a reflecting surface;
    said distance-measurement subsystem operative to receive a reflected portion of said visible laser light reflected from said point on said reflecting surface;
    a spatial-position-detecting subsystem operative to determine said measuring system's spatial position, in three dimensions, during a first measuring event; and said system's spatial position, in said three dimensions, during a second measuring event;
    an angular-orientation-detecting subsystem operative to determine an angle of rotation between said measuring system's first angular orientation during said first measuring event and said measuring system's second angular orientation during said second measuring event.

2. A measuring system as in claim 1 further comprising:
    an input-output subsystem operative to receive data signals from other said distance-measurement, said spatial-position-detecting and said angular-orientation-detecting subsystems;
    said input-output subsystem operative to convey said data signals to other said distance-measurement, said spatial-position-detecting, and said angular-orientation-detecting subsystems.

3. A measuring system as in claim 2 further comprising:
    an angular-displacement-detecting subsystem operative to determine angle between a line of a beam of light and a horizontal reference plane.

4. A measuring system as in claim 3 further comprising:
    a wireless input-output subsystem operative to send said data signals to a wireless receiving device.

5. A measuring system as in claim 3 further comprising:
    a data-detection-and-capture subsystem operative to capture data from said data signals conveyed to it;
    a data-storage subsystem operative to store said data from said data signals that have been captured;

a processing subsystem operative to execute algorithmic programs on said data and calculate one or a plurality of distance measurements;
a display subsystem operative to display results of said calculations on said distance measurements;
an activation-and-control subsystem operative to initiate a predetermined interaction between one or a plurality of said distance-measurement, spatial-position-detecting, angular-orientation-detecting, input-output, angular-displacement-detecting, data-detection-and-capture, data-storage, processing, and display subsystems.

6. A measuring system as in claim 5 further comprising:
said activation-and-control subsystem operative to initiate a predetermined interaction between one or a plurality of said distance-measurement, spatial-position-detecting, angular-orientation-detecting, input-output, angular-displacement-detecting, data-detection-and-capture, data-storage, processing, display, and wireless input-output subsystems.

7. A method comprising:
initiating a first measurement event;
turning on a visible-light laser beam;
pointing said laser beam at a first point on a reflecting surface;
receiving at least a portion of said laser beam reflected from said first point on said reflecting surface;
calculating distance between said measuring system and said first point during a first measurement event;
conveying said distance calculation data as a data signal to a data-storage subsystem;
storing said distance calculation data in said data-storage subsystem;
determining said measuring system's spatial position;
conveying said spatial-position data as said data signal to said data-storage subsystem;
storing said spatial-position data in said data-storage subsystem;
determining said measuring system's angular orientation relative to a fixed reference;
conveying said angular orientation data as said data signal to said data-storage subsystem;
storing said angular orientation data;
ending said first measurement event after storing said first measurement event's results.

8. A method as in claim 7 further comprising:
conveying said first measurement event results comprising distance calculation, spatial position, and angular orientation data as wireless data signals to one or a plurality of wireless receiving device or devices.

9. A method as in claim 7 further comprising:
initiating a second measurement;
turning on said visible-light laser beam;
pointing said laser beam at a second point on said reflecting surface;
receiving at least a portion of said laser beam reflected from said second point on said reflecting surface;
calculating distance between said measuring system and said second point during a second measurement event;
conveying said distance calculation data as said data signal to said data-storage subsystem;
storing said distance calculation data in said data-storage subsystem;
determining said measuring system's spatial position;
conveying said spatial-position data as said data signal to said data-storage subsystem;
storing said spatial-position data in said data-storage subsystem;
determining said measuring system's angular orientation relative to said fixed reference;
conveying said angular position data as said data signal to said data-storage subsystem;
storing said angular position data in said data-storage subsystem;
ending said second measurement event after storing said second measurement event results.

10. A method as in claim 9 further comprising:
conveying said second measurement event's results comprising said distance calculation, spatial position, and angular orientation data as said wireless data signals to said one or a plurality of said wireless receiving device or devices.

11. A method as in claim 9 comprising:
using said first measurement event's results data to calculate distance between said measuring system and said first point on said reflecting surface;
using said first measurement event's results data and said second measurement event results data to correct for any change in said spatial position of said measuring system between said first measurement event and said second measurement event;
using said first measurement event's results data and said second measurement event results data to determine the angle between said visible laser beam when pointed at said first point and said visible laser beam when pointed at said second point;
using said distance between said measuring system and said first point, and said distance between said measuring system and said second point, and said angle between said visible laser beam when pointed at said first point and said visible laser beam when pointed at said second point, and correcting for said any change in said spatial position of said measuring system during said first measurement event and said second measurement event, to determine the distance between said first point and said second point.

12. A method as in claim 11 further comprising:
using said first measurement event results data and said second measurement event results data to calculate the vertical position of said first point relative to a horizontal reference plane; and to calculate the said vertical position of a said second point relative to said horizontal reference plane.

13. A method as in claim 12 further comprising:
using said first measurement event results for said angular orientation relative to said horizontal reference of a said first point and said second measurement event results for said angular orientation relative to said horizontal reference of a said second point to measure any change in said angular orientation of said second point relative to said first point.

* * * * *